US012639891B2

(12) United States Patent
Li et al.

(10) Patent No.: US 12,639,891 B2
(45) Date of Patent: May 26, 2026

(54) METHOD AND APPARATUS FOR MODELING OBJECT, STORAGE MEDIUM, AND VEHICLE CONTROL METHOD

(71) Applicant: BEIJING TUSEN ZHITU TECHNOLOGY CO., LTD., Beijing (CN)

(72) Inventors: Zhichao Li, Beijing (CN); Naiyan Wang, Beijing (CN)

(73) Assignee: Beijing Tusen Zhitu Technology Co., Ltd., Beijing (CN)

( * ) Notice: Subject to any disclaimer, the term of this patent is extended or adjusted under 35 U.S.C. 154(b) by 292 days.

(21) Appl. No.: 18/460,348

(22) Filed: Sep. 1, 2023

(65) Prior Publication Data

US 2024/0078749 A1 Mar. 7, 2024

(30) Foreign Application Priority Data

Sep. 6, 2022 (CN) .......................... 202211083337.4

(51) Int. Cl.
G06T 17/00 (2006.01)
G06T 7/70 (2017.01)
(52) U.S. Cl.
CPC ................ G06T 17/00 (2013.01); G06T 7/70 (2017.01); *G06T 2207/10028* (2013.01); *G06T 2207/30241* (2013.01)
(58) Field of Classification Search
CPC . G06T 17/00; G06T 7/70; G06T 2207/10028; G06T 2207/30241
See application file for complete search history.

(56) References Cited

U.S. PATENT DOCUMENTS

| 11,113,873 B1 * | 9/2021 | Bosse | ..................... G06T 19/20 |
| 2021/0150807 A1 * | 5/2021 | Zhou | ...................... G06N 3/047 |
| 2021/0181758 A1 * | 6/2021 | Das | .......................... G06F 18/25 |
| 2021/0197852 A1 * | 7/2021 | Fairfield | .............. B60W 40/04 |

FOREIGN PATENT DOCUMENTS

| CN | 112477849 | 3/2021 |
| CN | 112396043 | 4/2021 |

OTHER PUBLICATIONS

Extended European Search Report in European Appln. No. 23193859.8, dated May 2, 2024, 9 pages.
EP Partial Search Report in European Appln. No. 23193859.8, dated Jan. 22, 2024, 11 pages.

* cited by examiner

*Primary Examiner* — Lixi C Simpson
(74) *Attorney, Agent, or Firm* — Fish & Richardson P.C.

(57) ABSTRACT

Disclosed are a method and apparatus for modeling an object, a storage medium, and a vehicle control method. The method for modeling an object includes obtaining a point cloud associated with surroundings acquired by a perception system so that points corresponding to each part of the object are respectively recognized from the point cloud, and then corresponding representations are respectively generated for the object wholly and each part thereof. As such, the object is modeled and the modeling precision is improved, whereby a movement state of the object may be accurately determined.

20 Claims, 11 Drawing Sheets

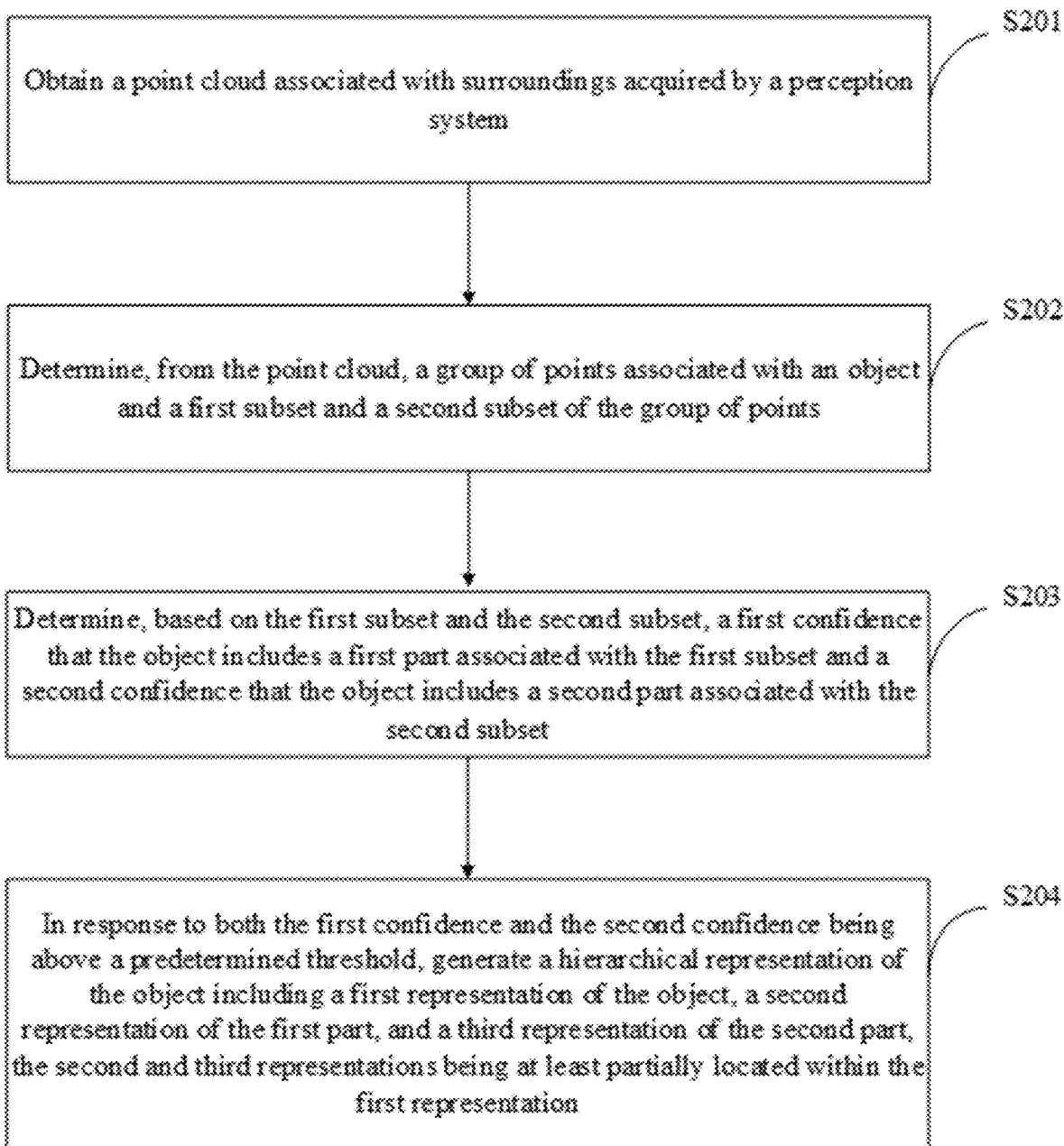

S201

Obtain a point cloud associated with surroundings acquired by a perception system

S202

Determine, from the point cloud, a group of points associated with an object and a first subset and a second subset of the group of points

S203

Determine, based on the first subset and the second subset, a first confidence that the object includes a first part associated with the first subset and a second confidence that the object includes a second part associated with the second subset

S204

In response to both the first confidence and the second confidence being above a predetermined threshold, generate a hierarchical representation of the object including a first representation of the object, a second representation of the first part, and a third representation of the second part, the second and third representations being at least partially located within the first representation

*FIG. 2*

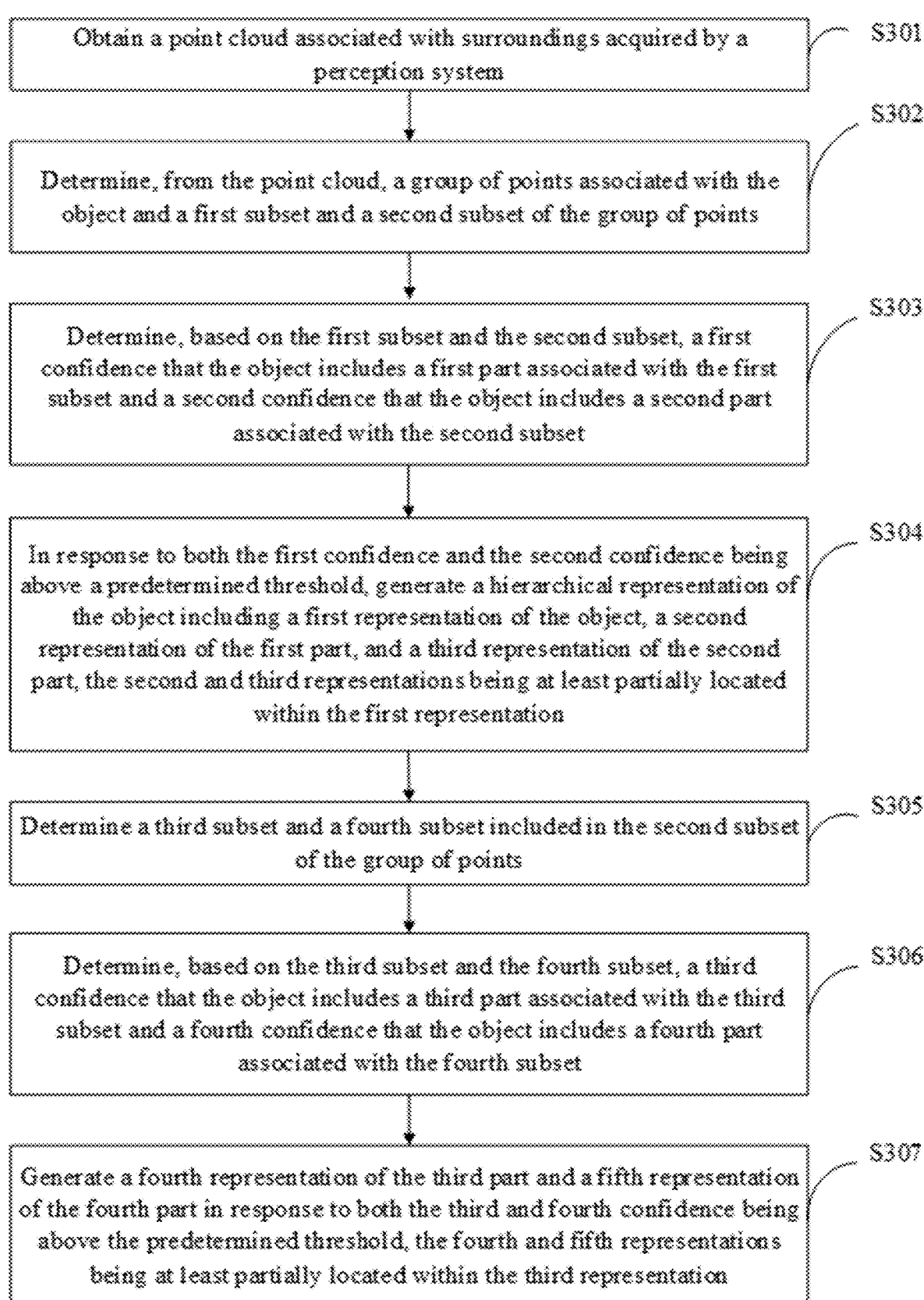

Obtain a point cloud associated with surroundings acquired by a perception system ⟶ S301

Determine, from the point cloud, a group of points associated with the object and a first subset and a second subset of the group of points ⟶ S302

Determine, based on the first subset and the second subset, a first confidence that the object includes a first part associated with the first subset and a second confidence that the object includes a second part associated with the second subset ⟶ S303

In response to both the first confidence and the second confidence being above a predetermined threshold, generate a hierarchical representation of the object including a first representation of the object, a second representation of the first part, and a third representation of the second part, the second and third representations being at least partially located within the first representation ⟶ S304

Determine a third subset and a fourth subset included in the second subset of the group of points ⟶ S305

Determine, based on the third subset and the fourth subset, a third confidence that the object includes a third part associated with the third subset and a fourth confidence that the object includes a fourth part associated with the fourth subset ⟶ S306

Generate a fourth representation of the third part and a fifth representation of the fourth part in response to both the third and fourth confidence being above the predetermined threshold, the fourth and fifth representations being at least partially located within the third representation ⟶ S307

Determine a type of the object based on the group of points

S402

Determine the first subset and the second subset of the group of points in response to the type of the object being a predetermined type Input
601

Feature
602

Detection
603

Detection
604

Output
605

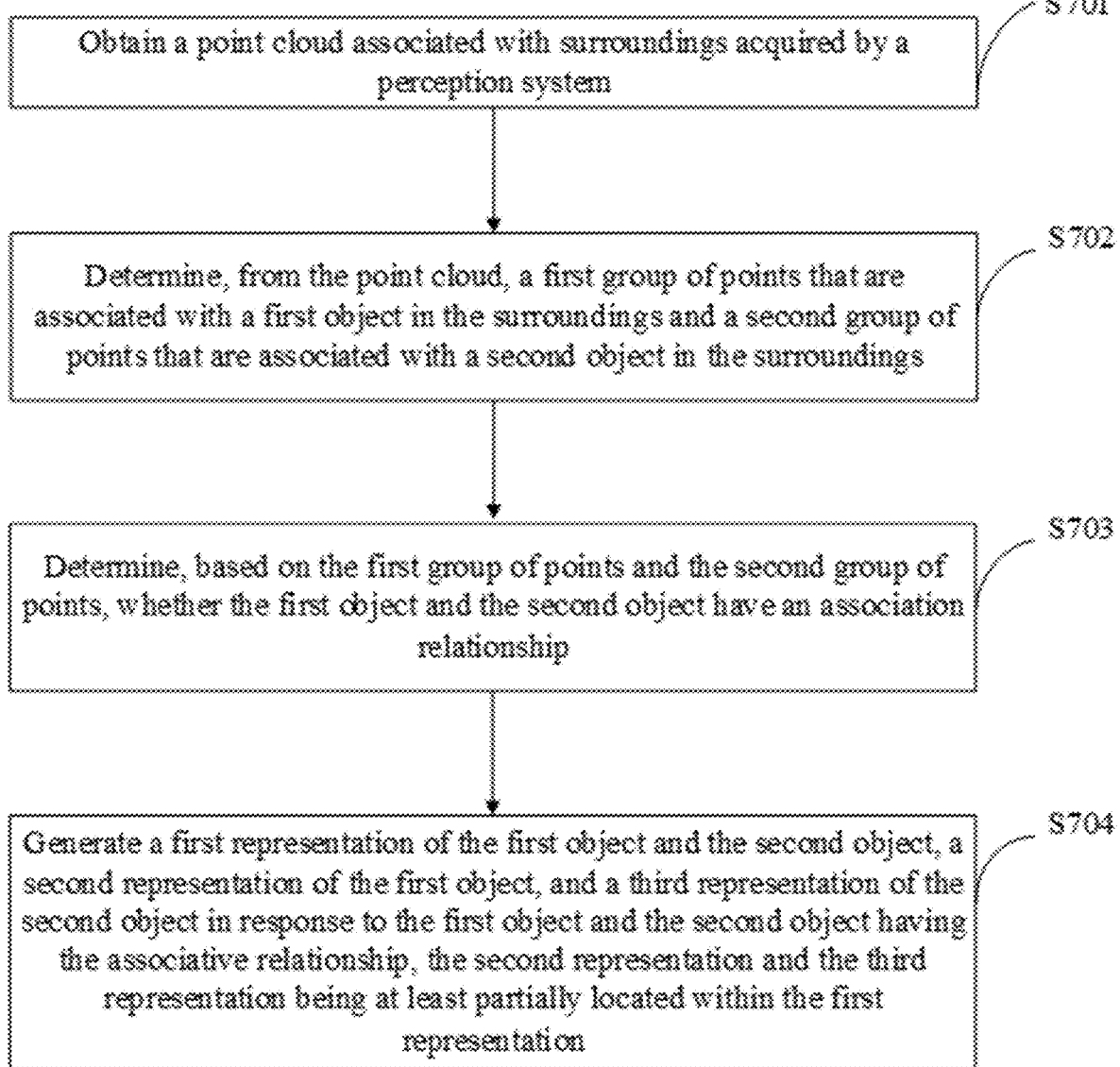

Obtain a point cloud associated with surroundings acquired by a perception system ⟋ S701

Determine, from the point cloud, a first group of points that are associated with a first object in the surroundings and a second group of points that are associated with a second object in the surroundings ⟋ S702

Determine, based on the first group of points and the second group of points, whether the first object and the second object have an association relationship ⟋ S703

Generate a first representation of the first object and the second object, a second representation of the first object, and a third representation of the second object in response to the first object and the second object having the associative relationship, the second representation and the third representation being at least partially located within the first representation ⟋ S704

*FIG. 7*

S901 Generate a hierarchical representation of an object in the surroundings

S902 Generate a path for the vehicle to travel along based on the hierarchical representation of the object S903 Control the vehicle to travel along the generated path

820

821 Truck

822 Tractor

823 Trailer

824 Trailer 1

825 Trailer 2

METHOD AND APPARATUS FOR MODELING OBJECT, STORAGE MEDIUM, AND VEHICLE CONTROL METHOD

CROSS-REFERENCE TO RELATED APPLICATIONS

This application claims priority to Chinese Patent Application No. 202211083337.4, titled "METHOD AND APPARATUS FOR MODELING OBJECT, STORAGE MEDIUM, AND VEHICLE CONTROL METHOD," filed on Sep. 6, 2022, the content of which is incorporated herein by reference in its entirety.

TECHNICAL FIELD

The present disclosure relates to sensor data processing and, more particularly, to a method and apparatus for modeling an object, a storage medium, and a vehicle control method.

BACKGROUND

With the development of autonomous driving, autonomous vehicles have been applied to freight transportation and passenger transportation. Generally, a traveling autonomous vehicle senses its surroundings through its sensors, such as light detection and ranging (LiDAR) systems and cameras. An autonomous driving system in an autonomous vehicle may generate a representation (e.g., a bounding box) of an object in the surroundings based on data acquired by sensors to express the pose and/or range of the object and to determine a movement state of the object. The autonomous driving system makes decisions and plans on the traveling of the autonomous vehicle, and finally, controls the autonomous vehicle to travel as decided and planned.

For reasonable planning, the autonomous driving system needs to generate an accurate representation of the object in the surroundings so as to accurately determine the movement state of the object.

SUMMARY

The present disclosure provides a method and apparatus for modeling an object, a storage medium, and a program product to generate an accurate representation of the object in the surroundings of a vehicle, especially, an autonomous vehicle, so as to accurately determine the movement state of the object.

In a first aspect, the present disclosure provides a method for modeling an object, including:

obtaining (or receiving), from a perception system, a point cloud associated with surroundings of the perception system;

determining, from the point cloud, a group of points associated with an object and a first subset and a second subset of the group of points;

determining, based on the first subset and the second subset, a first confidence that the object includes a first part associated with the first subset and a second confidence that the object includes a second part associated with the second subset; and in response to both the first confidence and the second confidence being above a predetermined threshold, generating a hierarchical representation of the object, including a first representation of the object, a second representation of the first part, and a third representation of the second part, the second and third representations being at least partially located within the first representation.

In a second aspect, the present disclosure provides a method for modeling an object, including:

obtaining (or receiving), from a perception system, a point cloud associated with surroundings of the perception system;

determining, from the point cloud, a first group of points that are associated with a first object in the surroundings and a second group of points that are associated with a second object in the surroundings;

determining, based on the first group of points and the second group of points, whether the first object and the second object have an association relationship;

generating a first representation of the first object and the second object, a second representation of the first object, and a third representation of the second object in response to the first object and the second object having the association relationship, the second representation and the third representation being at least partially located within the first representation.

In a third aspect, the present disclosure provides an apparatus for modeling an object, including:

an obtaining module configured to obtain (or receive), from a perception system, a point cloud associated with surroundings of the perception system;

a determining module configured to determine, from the point cloud, a group of points associated with the object and a first subset and a second subset of the group of points;

a confidence module configured to determine, based on the first subset and the second subset, a first confidence that the object includes a first part associated with the first subset and a second confidence that the object includes a second part associated with the second subset; and a generating module configured to, in response to both the first confidence and the second confidence being above a predetermined threshold, generate a hierarchical representation of the object, including a first representation of the object, a second representation of the first part, and a third representation of the second part, the second and third representations being at least partially located within the first representation.

In a fourth aspect, the present disclosure provides an apparatus for modeling an object, including:

an obtaining module configured to obtain (or receive), from a perception system, a point cloud associated with surroundings of the perception system;

a determining module configured to determine, from the point cloud, a first group of points that are associated with a first object in the surroundings and a second group of points that are associated with a second object in the surroundings;

a determination module configured to determine, based on the first group of points and the second group of points, whether the first object and the second object have an association relationship;

a generating module configured to generate a first representation of the first object and the second object, a second representation of the first object, and a third representation of the second object in response to the first object and the second object having the association relationship, the second representation and the third representation being at least partially located within the first representation.

In a fifth aspect, the present disclosure provides an electronic device, including: a processor, and a memory communicatively coupled to the processor, wherein the memory stores program instructions; and the processor executes the program instructions stored in the memory to implement the method according to the first or second aspect.

In a sixth aspect, the present disclosure provides a computer-readable storage medium, wherein the computer-readable storage medium stores program instructions executable by a processor to implement the method according to the first or second aspect.

In a seventh aspect, the present disclosure provides a computer program product, wherein the computer program product includes a computer program executable by a processor to implement the method according to the first or second aspect.

In an eighth aspect, the present disclosure provides a vehicle control method, including:

generating, by a computing device of the vehicle, a hierarchical representation of an object in the surroundings based on the method according to the first or second aspect;

generating, by the computing device, a path (or trajectory) for the vehicle to travel along based on the hierarchical representation of the object; and controlling, by the computing device, the vehicle to travel along the path (or trajectory) as generated.

According to the method and apparatus for modeling an object, the storage medium, and the vehicle control method provided by the present disclosure, a point cloud associated with surroundings acquired by a perception system is obtained so that points corresponding to each part of the object in the surroundings are respectively recognized from the point cloud, and then corresponding representations are respectively generated for the whole object and each part thereof. As such, the object is modeled and the modeling precision is improved, whereby a movement state of the object may be accurately determined.

BRIEF DESCRIPTION OF THE DRAWINGS

The accompanying drawings, which are incorporated in and constitute a part of the specification, illustrate embodiments in line with the present disclosure and, in conjunction with the specification, serve to explain the principles of the present disclosure.

FIG. 2 is a flowchart of a method for modeling an object according to an embodiment of the present disclosure;

FIG. 3 is a flowchart of the method for modeling an object according to another embodiment of the present disclosure;

FIG. 7 is a flowchart of a method for modeling an object according to another embodiment of the present disclosure;

Figure 1A:
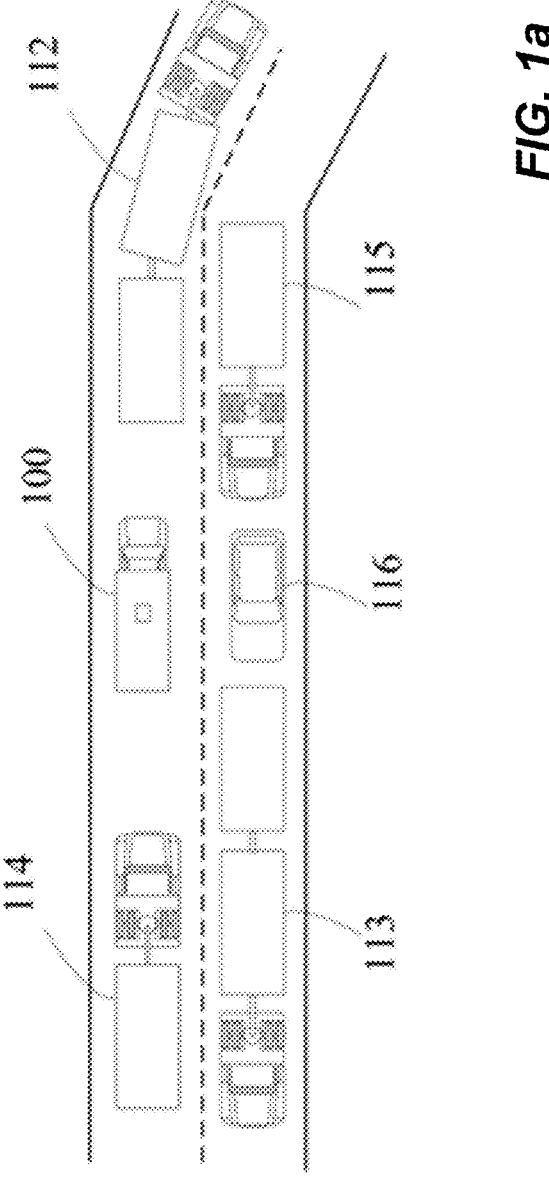
FIG. 1a shows an example scenario of the present disclosure.

Specific embodiments of the present disclosure have been shown in the above drawings and will be described in greater detail hereinafter. The drawings and written description are not intended to limit the scope of the concepts of the present disclosure in any way, but rather to illustrate the concepts of the present disclosure to one of ordinary skill in the art by reference to specific embodiments.

DETAILED DESCRIPTION

Reference will now be made in detail to exemplary embodiments, examples of which are illustrated in the accompanying drawings. Where the following description refers to the accompanying drawings, like numbers in different drawings indicate the same or similar elements, unless otherwise indicated. The embodiments described in the following illustrative examples do not represent all embodiments in line with the present disclosure. Rather, they are merely examples of the apparatus and method in line with certain aspects of the present disclosure as detailed in the appended claims.

An autonomous vehicle may include a plurality of sensors to capture sensor data corresponding to the surroundings of the vehicle. The surroundings may typically include a plurality of objects. In an object detection task, bounding boxes may be used to identify the location and size of the objects. That is to say, the objects in the surroundings may be represented as bounding boxes. For example, in a two-dimensional representation parallel to the ground, an occupied area and shape of an object in the surroundings may be approximated by a rectangular bounding box, thereby representing the object in the surroundings. It is common in the prior art to represent one object in the surroundings as one bounding box.

The object in the surroundings may be an articulated object including at least two parts connected to each other, and these parts are rotatable relative to each other. An example of the articulated object is a truck including a tractor and a trailer. The inventors of the present disclosure have noticed that if the articulated object is represented as a single bounding box (e.g., a single rectangular bounding box), the exact movement state of the articulated object cannot be obtained, which may lead to an erroneous estimation of the movement state of the articulated object. For example, when a truck turns, an angle is formed between the tractor and the trailer, and where a single bounding box is taken to represent the truck, an area of the bounding box does not match the occupied area of the truck, which may result in an overestimation of the occupied area of the truck. In particular, where the truck actually occupies only one lane, the bounding box of the truck may occupy two lanes on the map.

To solve the problem that the area of the bounding box does not match the actual occupied area of the articulated object, it is preferable to consider each part of the articulated object as an independent object represented by one bounding box. For example, the tractor and the trailer of the truck may be viewed as distinct objects that are independent of each other and are represented by different bounding boxes. Such expression is simpler, but it does not accurately express the movement pattern of the articulated object and increases the difficulty of estimating the movement state (e.g., trajectory) of the articulated object. For example, the tractor of a truck has power, and the trailer has no power, hence the movement patterns of the tractor and the trailer are supposed to be different, and the movement of the trailer will be constrained by the movement of the tractor. With an incorrect movement model, the trajectories of the tractor and the trailer may deviate significantly from each other in the prediction of the trajectories of the tractor and the trailer.

The techniques described in this disclosure may be taken to process sensor data to generate a hierarchical representation of an object in its surroundings to accurately represent the object, so as to navigate a vehicle, such as an autonomous vehicle, forward in the surroundings and avoid related objects in the surroundings, such as other vehicles in the surroundings.

In summary, the present disclosure provides a method for modeling an object (i.e., a method for generating a hierarchical representation of an object) by obtaining a point cloud acquired by a perception system and associated with the surroundings; the points corresponding to the whole object and each part of the object are recognized from the point cloud, and then corresponding representations are generated for the whole object and each part of the object, so as to realize the modeling of the object and improve the modeling precision; therefore the movement state of the object can be accurately determined.

The method for modeling an object provided herein (i.e., the method for generating a hierarchical representation of an object) may be applied to vehicle control. A point cloud associated with the surroundings is acquired by a perception system of the vehicle, and a computing device of the vehicle obtains the point cloud associated with the surroundings acquired by the perception system (that is, the computing device may receive the point cloud from the perception system). The computing device determines a group of points associated with an object (i.e., an object in the surroundings) from the point cloud and a first subset and a second subset of the group of points, determines, based on the first subset and the second subset, a first confidence that the object includes a first part associated with the first subset and a second confidence that the object includes a second part associated with the second subset, and in response to both the first confidence and the second confidence being above a predetermined threshold, generates a hierarchical representation of the object, including a first representation of the object, a second representation of the first part, and a third representation of the second part, where the second and third representations are located at least partially within the first representation. The computing device generates a path (or trajectory) along which the vehicle is to travel based on the hierarchical representation of the object, and controls the vehicle to travel along the generated path (or trajectory).

FIG. 1a shows an example scenario. As shown in FIG. 1a, the vehicle 100 is traveling on a lane on the road, with the truck 112 traveling in front thereof and the truck 114 traveling behind. On another lane nearby, trucks 113 and 115 and a car 116 are traveling. The vehicle 100 may be an autonomous vehicle that will consider the movement state of the trucks 112, 113, 114, 115 and the car 116 when planning a travel path (or a trajectory). Furthermore, FIG. 1a also shows that the trucks 112 and 113 include a tractor and two trailers, and the trucks 114 and 115 include a tractor and one trailer.

Figure 1B:
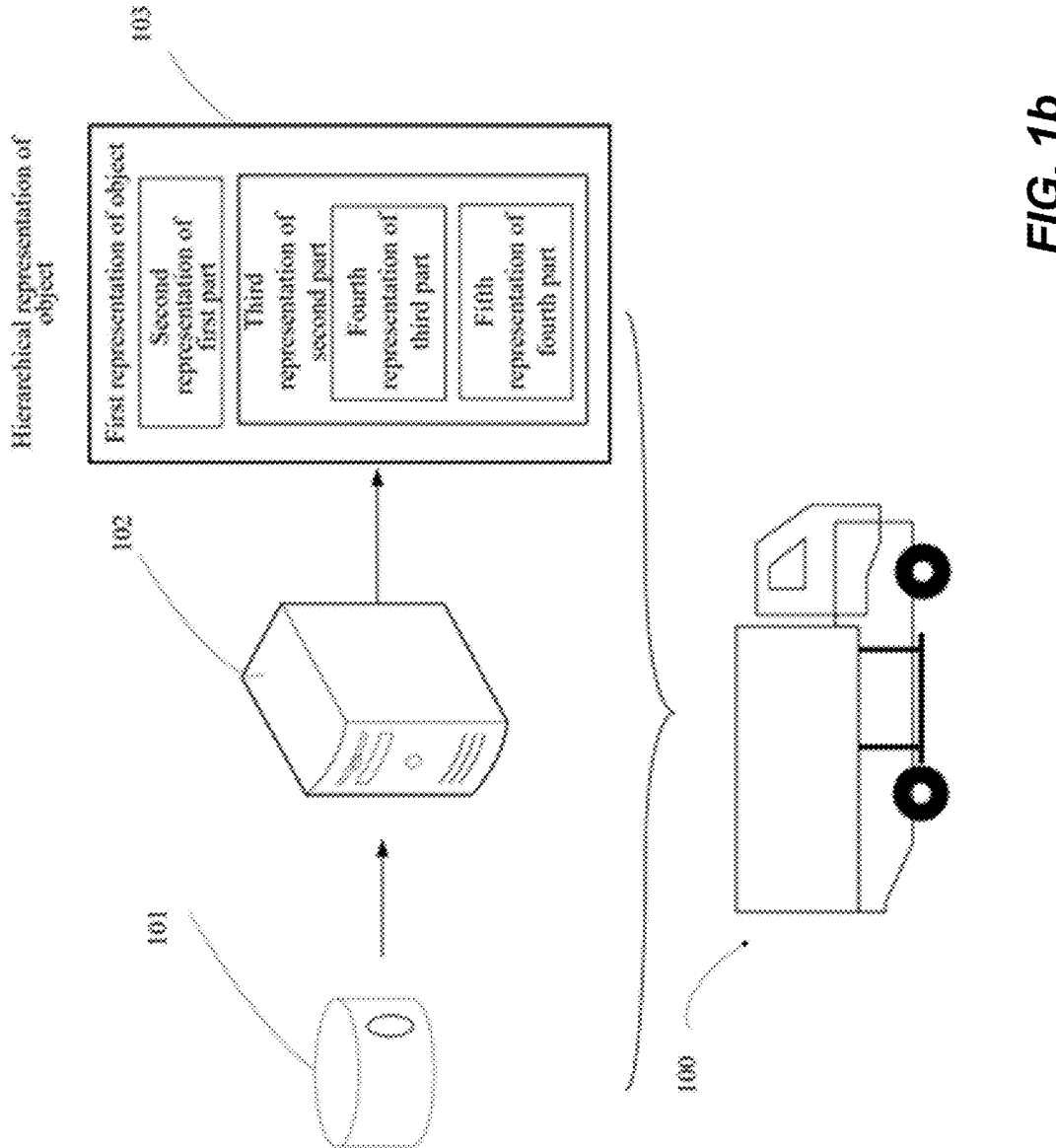
FIG. 1b is a schematic view of a vehicle according to an exemplary embodiment of the present disclosure.

FIG. 1b shows a schematic view of a vehicle (e.g., the vehicle 100 shown in FIG. 1a) according to an exemplary embodiment of the present disclosure. As shown in FIG. 1b, the vehicle 100 includes a perception system 101 and a computing device 102. The perception system 101 is a sensor system and may include a plurality of sensors, such as one or more of an inertial measurement unit (IMU) a global navigation satellite system (GNSS) transceiver (e.g., a global positioning system (GPS) transceiver), a radio detection and ranging (RADAR) system, a light detection and ranging (LiDAR) system, an acoustic sensor, an ultrasound sensor, and a camera.

The perception system 101 acquires sensor data associated with the surroundings of the vehicle 100 (i.e., the surroundings of the perception system 101). For example, the LiDAR in the perception system 101 may acquire a point cloud associated with the surroundings of the vehicle 100, the camera in the perception system 101 may acquire an image associated with the surroundings of the vehicle 100, and the LiDAR and the camera in the perception system 101 may have overlapping fields of view such that, the image acquired by the camera and the point cloud acquired by the LiDAR at the same time or nearly the same time have data about the same object.

The perception system 101 may transmit the sensor data to the computing device 102, and the computing device 102 may detect or recognize content associated with the object in the surroundings of the vehicle 100 from the sensor data. For example, the computing device 102 detects or recognizes points associated with the object in the surroundings of the vehicle 100 (e.g., the truck 112, 113, 114, or 115 or the car 116 of FIG. 1a) from a point cloud acquired by the LiDAR. In the case of an articulated object, the computing device 102 detects or recognizes the points corresponding to the whole object and the parts of the object from the point cloud, and generates corresponding representations for the whole object and the parts thereof, respectively, thereby generating a hierarchical representation 103 of the object. For example, where the articulated object includes a first part and a second part that are rotatable relative to each other, the hierarchical representation of the object 103 includes a first representation of the object, a second representation of the first part, and a third representation of the second part; where the second part further includes a third part and a fourth part that are rotatable relative to each other, the hierarchical representation of the object 103 further includes a fourth representation of the third part and a fifth representation of the fourth part. An example of the representation of the object and the representation of the parts of the object is a bounding box, e.g., a rectangular bounding box. As such, accurate modeling of the object is achieved. For example, where the articulated object is a truck, the hierarchical representation of the truck is generated to include the first representation of the whole truck, the second representation of the tractor of the truck, and the third representation of the trailer of the truck. The computing device 102 may accurately determine the movement state of the object based on the accurate modeling of the object.

FIG. 2 is a flowchart of the method for modeling an object according to an exemplary embodiment of the present disclosure. The present embodiment provides a method for modeling an object for generating the hierarchical representation of the object. The method is implemented by any electronic device, such as the computing device 102 shown in FIG. 1b.

As shown in FIG. 2, in step S201, the point cloud associated with the surroundings acquired by the perception system is obtained.

While the vehicle (e.g., the vehicle 100 shown in FIGS. 1a and 1b) is traveling, a perception system (e.g., the perception system 101 shown in FIG. 1b) may be employed to acquire sensor data associated with the surroundings of the vehicle 100 (i.e., the surroundings of the perception system 101). The sensor data acquired by the perception system includes, for example, a point cloud associated with the surroundings of the vehicle 100 acquired by the LiDAR of the perception system, and an image associated with the surroundings of the vehicle 100 acquired by the camera of the perception system. The perception system 101 may transmit the point cloud acquired by the LiDAR to the computing device 102. In addition to the point cloud, the perception system 101 may transmit the image acquired by the camera or data acquired by other sensors to the computing device 102. The computing device 102 may model the object in the surroundings of the vehicle 100 based on the sensor data (e.g., the point cloud) received from the perception system 101 to generate the hierarchical representation of the object.

Some objects in the surroundings (e.g., the trucks 112, 113, 114, and 115 of FIG. 1a) may be articulated objects, and other objects may be non-articulated objects (e.g., the car 116 of FIG. 1a). The articulated object includes at least two parts that are relatively rotatable. By way of example, the articulated object is a truck including a tractor and a trailer, where the trailer is rotatable relative to a particular point of the tractor. Where a truck includes a plurality of trailers, one trailer may rotate relative to a particular point of another trailer.

In step S202, a group of points associated with the object, as well as a first subset and a second subset of the group of points, are determined from the point cloud.

After receiving sensor data including the point cloud from the perception system 101, the computing device 102 may determine from the point cloud the group of points associated with the object in the surroundings of the vehicle and determine a plurality of subsets of the group of points, such as the first subset and the second subset.

The computing device 102 may perform object detection on the point cloud through various object detection methods, and through the object detection, the computing device 102 may determine which points in the point cloud are formed by the same object in the surroundings reflecting the light of LiDAR, and which points in the point cloud are formed by parts of the object reflecting the light of LiDAR. Therefore, the group of points and one or more subsets of the group of points associated with the object are determined, a representation (e.g., a bounding box) of the object is generated based on the group of points, and representations (e.g., bounding boxes) of one or more parts of the object are generated based on the subset of the group of points. Examples of object detection methods employed by the computing device 102 include bird's eye view (BEV)-based object detection methods and frustum-based object detection methods.

When using the BEV-based object detection method, the computing device 102 first performs feature detection on the point cloud to determine the group of points associated with the object in the surroundings, and then performs feature detection on the group of points (e.g., through region-of-interest pooling) to determine the first subset and the second subset. The BEV-based object detection method will be described in detail below in conjunction with FIG. 5.

As described above, the LiDAR in the perception system 101 may acquire the point cloud associated with the surroundings of the vehicle 100, the camera in the perception system 101 may acquire the image associated with the surroundings of the vehicle 100, and the LiDAR and the camera in the perception system 101 may have overlapping fields of view. When the frustum-based object detection method is employed, the computing device 102 determines content associated with the object in the surroundings from the image by performing detection on the image captured by the camera, and the content associated with the object in the surroundings from the image may be marked as a rectangular box for example. A part of the point cloud is then determined based on the content from the image, and feature detection is performed on the part of the point cloud to determine, from the point cloud, a group of points, a first subset of the group of points, and a second subset of the group of points associated with the object in the surroundings. The frustum-based object detection method will be described in detail below in conjunction with FIG. 6.

In step S203, based on the first subset and the second subset, a first confidence that the object includes a first part associated with the first subset and a second confidence that the object includes a second part associated with the second subset are determined.

On one hand, the object in the surroundings of the vehicle 100 may include an articulated object and a non-articulated object. An example of the non-articulated object is a car whose body is substantially rigid. On the other hand, the sensor on the vehicle 100 may only sense a part of an articulated object when the vehicle 100 is in a particular relative positional relationship with the articulated object in the surroundings. For example, as shown in FIG. 1a, where the vehicle 100 is directly in front of the truck 114, and the tractor of the truck 114 is completely blocking the trailer, the sensor of the vehicle 100 may only sense the tractor of the truck 114 and cannot sense the trailer of the truck 114. In other cases, the trailer of a truck near the vehicle 100 may be blocked by other vehicles, trees, buildings, and the sensor of the vehicle 100 may also only sense the tractor of the truck.

Where the computing device 102 determines the group of points associated with the object in the surroundings from the point cloud and determines the subsets of the group of points (e.g., the first subset and the second subset), the computing device 102 may simultaneously determine the confidence corresponding to the group of points (i.e., a confidence of existence of the object in the surroundings) and determine confidences corresponding to the first subset and the second subset (i.e., the first confidence corresponding to the first subset and the second confidence corresponding to the second subset).

The computing device 102 may, after determining the group of points associated with the object in the surroundings from the point cloud and determining the subsets of the group of points (e.g., the first subset and the second subset), determine a confidence corresponding to the group of points (i.e., a confidence of existence of the object in the surroundings), and determine confidences corresponding to the first subset and the second subset (i.e., the first confidence corresponding to the first subset and the second confidence corresponding to the second subset).

If the confidence corresponding to the group of points is lower than a predetermined threshold value, then the detection result is inaccurate and discarded. Only when the confidence corresponding to the group of points is above the predetermined threshold, it concludes that the relevant object is detected (or the object exists in the surroundings). If the confidence corresponding to the group of points is above the predetermined threshold, the computing device 102 further determines the first confidence corresponding to the first subset (i.e., the confidence that the object includes the first part associated with the first subset) and the second confidence corresponding to the second subset (i.e., the confidence that the object includes the second part associated with the second subset).

If either the first confidence or the second confidence is low, for example, lower than the predetermined threshold, then the object corresponding to the group of points is not an articulated object, or the articulated object is partially blocked.

In step S204, a hierarchical representation of the object is generated in response to both the first confidence and the second confidence being above the predetermined threshold, where the hierarchical representation includes a first representation of the object, a second representation of the first part, and a third representation of the second part, and the second and third representations are at least partially located within the first representation.

As described above, where either the first confidence or the second confidence is lower than the predetermined threshold, the object sensed by the perception system 101 is a non-articulated object, or the object sensed by the perception system 101 is an articulated object that is partially blocked. Only when both the first confidence and the second confidence are above the predetermined threshold, it concludes that the perception system 101 senses an articulated object and that the perception system 101 senses at least two parts of the articulated object. The computing device 102 then generates the hierarchical representation of the object, including the representation of the object (i.e., a representation of the object entirety), and representations of the parts of the object as sensed, which are at least partially within the representation of the object. Examples of the representation of the object and representations of the parts of the object are bounding boxes, e.g., rectangular bounding boxes.

The present disclosure provides a method for modeling an object, the method including: obtaining a point cloud associated with surroundings acquired by a perception system; determining the group of points associated with the object from the point cloud and the first subset and the second subset of the group of points; determining, based on the first subset and the second subset, a first confidence that the object includes a first part associated with the first subset and a second confidence that the object includes a second part associated with the second subset; and in response to both the first confidence and the second confidence being above a predetermined threshold, generating a hierarchical representation of the object, including a first representation of the object, a second representation of the first part, and a third representation of the second part, the second and third representations being at least partially located within the first representation. By determining the group of points associated with the object and the first subset and the second subset of the group of points from the point cloud, and then generating representations for the object and the first part and the second part included by the object, respectively, the method achieves modeling of the object, and the modeling accuracy is improved, hence the movement state of the object may be determined accurately.

FIG. 3 shows a flowchart of a method for modeling an object (i.e., a method for generating a hierarchical representation of an object) according to another embodiment of the present disclosure, which takes into account the situation where an articulated object may include three or more parts that can rotate relative to each other (e.g., a truck including a tractor and two trailers). The method shown in FIG. 3 is implemented by any electronic device, such as the computing device 102 shown in FIG. 1b. Steps S301 to S304 in FIG. 3 are substantially the same as steps S201 to S204 of FIG. 2, and therefore, these steps will not be described in detail below. As shown in FIG. 3, in step S301, the point cloud associated with the surroundings acquired by the perception system is obtained. In step S302, a group of points associated with the object, as well as a first subset and a second subset of the group of points, are determined from the point cloud. In step S303, based on the first subset and the second subset, a first confidence that the object includes a first part associated with the first subset and a second confidence that the object includes a second part associated with the second subset are determined. In step S304, a hierarchical representation of the object is generated in response to both the first confidence and the second confidence being above the predetermined threshold, where the hierarchical representation includes a first representation of the object, a second representation of the first part, and a third representation of the second part, and the second and third representations are at least partially located within the first representation.

As shown in FIG. 3, in step S305, a third subset and a fourth subset included by the second subset of the group of points generated in step S302 are determined.

After step S304, the computing device 102 may determine a plurality of subsets, e.g., the third subset and the fourth subset, of a subset as determined in step S302, for example, the second subset.

In step S306, a third confidence that the object includes a third part associated with the third subset and a fourth confidence that the object includes a fourth part associated with the fourth subset are determined based on the third subset and the fourth subset.

Where the method for modeling an object of the present disclosure employs the BEV-based object detection method, the computing device 102 may perform feature detection on either the first subset or the second subset, for example, the second subset (e.g., through region-of-interest pooling) to determine the third subset and the fourth subset, as well as the confidences of the third subset and the fourth subset, respectively.

Where the method for modeling an object of the present disclosure employs the frustum-based object detection method, after the first subset and the second subset are determined, either the first subset or the second subset, for example, the second subset, may be subjected to feature detection (e.g., through region-of-interest pooling) to determine the third subset and the fourth subset, as well as confidences of the third subset and the fourth subset, respectively.

If either the third confidence or the fourth confidence is determined to be low, for example, lower than a predetermined threshold, it is possible that the articulated object includes only two parts, or that the articulated object is partially blocked.

In step S307, a fourth representation of the third part, a fifth representation of the fourth part are generated in response to both the third and fourth confidences being above the predetermined threshold, and the fourth and fifth representations are at least partially located within the third representation.

As described above, if one of the third confidence and the fourth confidence is lower than the predetermined threshold, then the articulated object sensed by the perception system 101 includes only two parts, namely, the first part and the second part, or that the articulated object is partially blocked. Only when both the third confidence and the fourth confidence are higher than the predetermined threshold, it concludes that the perception system 101 senses an articulated object that includes at least three parts, namely the first part, the third part, and the fourth part (the second part of the articulated object is composed of the third part and the fourth part). The hierarchical representation of the object generated by the computing device 102 includes the representation of the object and the representations the sensed parts of the object (the first part of the object, the second part of the object, the third part of the object, and the fourth part of the object), the representations of the parts of the object are at least partially located within the representation of the object, and the representations of the third and fourth parts of the object are at least partially located within the representation of the second part of the object. Examples of the representations of the object and the representations of the parts of the object are bounding boxes, e.g., rectangular bounding boxes.

It should be noted that if the second part of the object includes more parts other than the third part and the fourth part, the process described above may also be applied to the further parts to generate corresponding representations, and the description thereof will not be repeated here. Furthermore, if the first part of the object may also include different parts, the process described above may also be applied to generate corresponding representations.

In some embodiments, the first representation has a first geometry, the second representation has a second geometry, the third representation has a third geometry, the fourth representation has a fourth geometry, and the fifth representation has a fifth geometry. Herein, the first geometry, the second geometry, the third geometry, the fourth geometry, and the fifth geometry may take the form of any geometry according to the object and/or the parts of the object to represent a contour of the object and/or the parts of the object. For example, in the case of modeling in a three-dimensional space, one or more of the first geometry, the second geometry, the third geometry, the fourth geometry, and the fifth geometry may be a cuboid; for another example, in the case of modeling in a two-dimensional space, one or more of the first geometry, the second geometry, the third geometry, the fourth geometry, and the fifth geometries may be rectangular.

Figures 4, 5:
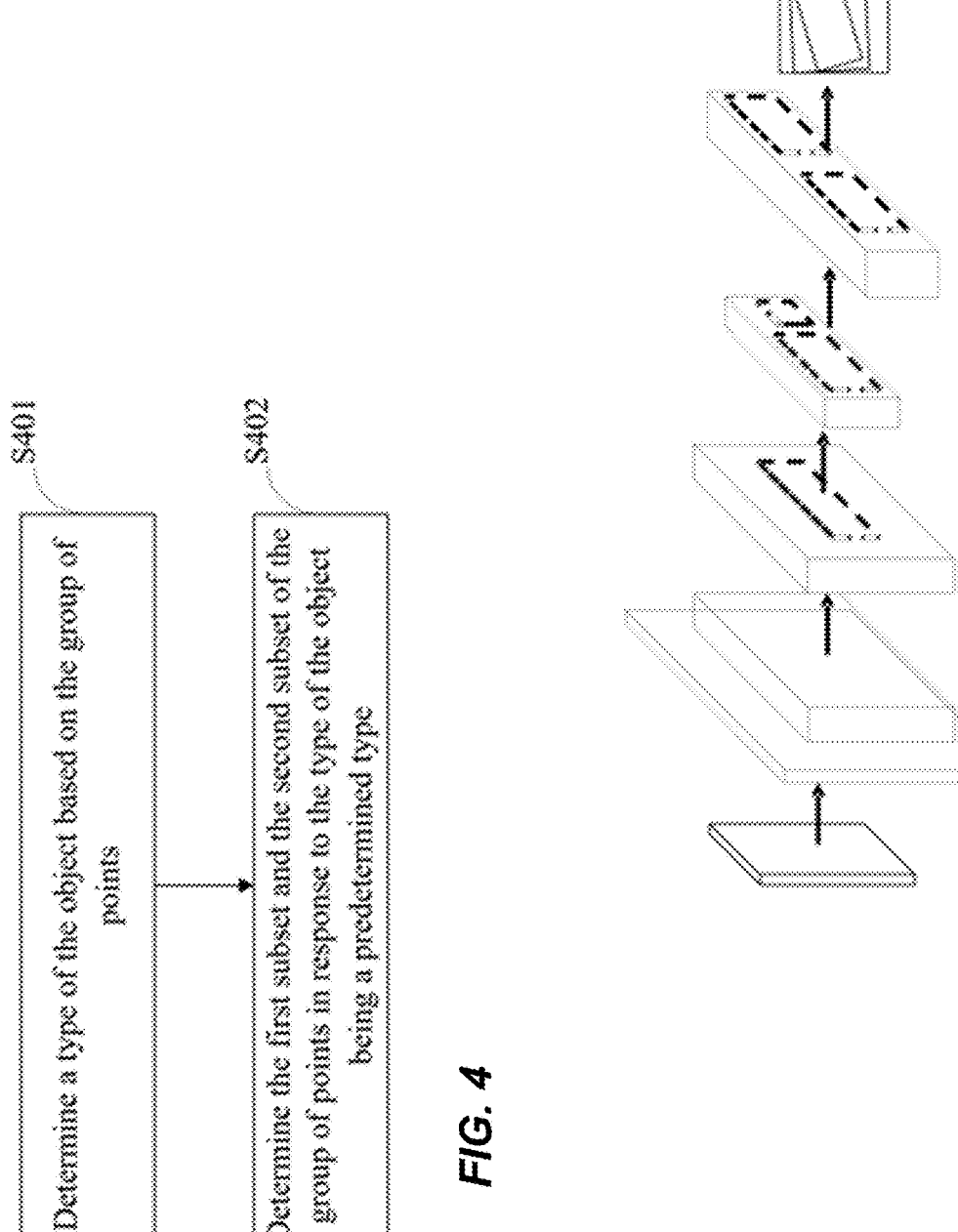
FIG. 4 is an exemplary implementation of a step in the method of FIG. 2 or 3.
FIG. 5 is a schematic diagram of a BEV-based object detection method provided by an embodiment of the present disclosure.

In some embodiments, as shown in FIG. 4, step S202 of FIG. 2 and step S302 of FIG. 3 determining the group of points associated with the object, the first subset and the second subset of the group of points, from the point cloud, includes:

step S401, determining a type of the object based on the group of points; and step S402, determining the first subset and the second subset of the group of points in response to the type of the object being a predetermined type.

After the group of points associated with the object is determined from the point cloud in step S202 of FIG. 2 and step S302 of FIG. 3, the type of the object is determined based on the group of points. Where the type of the object is determined to be an articulated object, the first subset and the second subset of the group of points are determined.

For example, when employing the BEV-based object detection method, after the computing device 102 determines the group of points associated with the object, the type of the object is determined based on the group of points, and a bounding box representing the object is determined. The first subset of the group of points associated with the first part of the object and the second subset of the group of points associated with the second part of the object are further determined only if the object is determined as an articulated object.

The BEV-based object detection method is described below by taking a PointPillars algorithm model (hereinafter referred to as PointPillars) as an example in conjunction with FIG. 5. Those skilled in the art will appreciate that the BEV-based object detection method may be implemented using other neural network or algorithm models other than PointPillars.

The conventional PointPillars network architecture includes an input network, a feature extraction network, a detection head, and an output network. FIG. 5 shows a PointPillars network architecture according to the present disclosure. As shown in FIG. 5, the PointPillars network architecture of the present disclosure additionally includes detection heads, e.g., a detection head 504 and a detection head 505 that perform region-of-interest pooling (abbreviated as ROI pooling) with respect to the conventional network architecture. It will be appreciated by those skilled in the art that while FIG. 5 illustrates two detection heads performing ROI pooling, the PointPillars network architecture may include more or fewer detection heads performing ROI pooling.

As shown in FIG. 5, an input network 501 may receive a point cloud, such as the point cloud acquired by the LiDAR of the perception system 101 of FIG. 1b, and pass the received point cloud to a feature extraction network 502. The feature extraction network 502 may segment the point cloud received from the input network 501 into a plurality of Pillar units to convert the point cloud into a pseudo-image and extract features from the pseudo-image using a convolutional neural network. The detection head 503 performs object detection according to the features extracted by the feature extraction network 502 so as to determine the group of points associated with the object in the surroundings of the vehicle (e.g., the vehicle 100) from the point cloud, generates the representation (e.g., a bounding box) of the object accordingly, and generates a confidence (i.e., a confidence of the existence of the object) corresponding to the group of points. The detection head 504 then performs the ROI pooling on the group of points, determines a plurality of subsets (e.g., the first subset and the second subset) of the group of points to predict a plurality of parts of the object, such as the first part associated with the first subset and the second part associated with the second subset, and generates bounding boxes for the first part and the second part and confidences corresponding to the first part and the second part (i.e., a confidence that the object includes the first part and a confidence that the object includes the second part). The detection head 505 then performs the ROI pooling on at least one subset (e.g., the second subset) of the plurality of subsets as determined by the detection head 504, determines a plurality of subsets (e.g., the third subset and the fourth subset) of the second subset to predict a plurality of the parts of the second part of the object, such as the third part associated with the third subset and the fourth part associated with the fourth subset, and generates bounding boxes for the third part and the fourth part and confidences corresponding to the third part and the fourth part (i.e., a confidence that the object includes the third part and a confidence that the object includes the fourth part). An output network 506 outputs a hierarchical representation of the object composed of bounding boxes based on the above mentioned confidences.

In some embodiments, the detection head 503, after performing object detection, determines the type of the detected object, and if the detected object is an articulated object, the detection head 503 provides its detection result to the detection head 504 for ROI pooling. If the detected object is not an articulated object, the detection result is not provided to the detection head 504, but is directly provided to the output network 506 for output.

Figure 6:
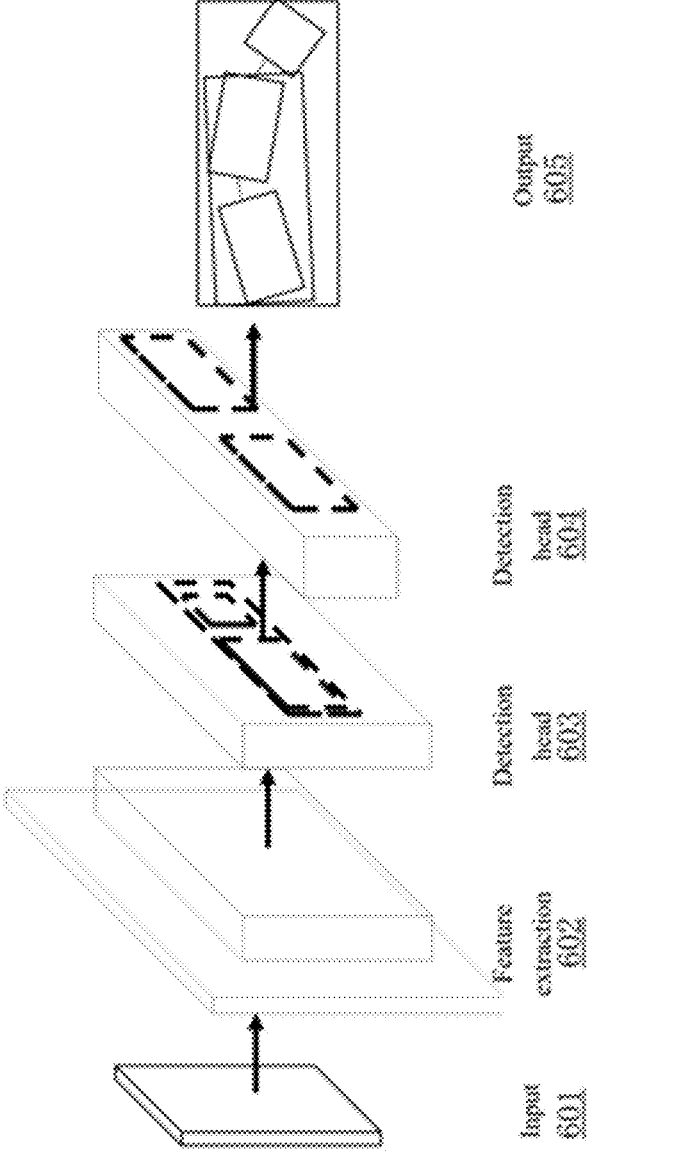
FIG. 6 is a schematic diagram of a frustum-based object detection method according to an embodiment of the present disclosure.

The frustum-based object detection method is described in detail below in conjunction with FIG. 6. The network architecture of conventional frustum-based object detection methods includes an input network, a feature extraction network, a detection head, and an output network. FIG. 6 illustrates a network architecture of the frustum-based object detection method according to the present disclosure. The network architecture of the present disclosure improves upon conventional network architecture detection heads by, on the one hand, splitting a detection head (e.g., a detection head 603 of FIG. 6) into multiple branches and, on the other hand, adding a detection head (e.g., a detection head 604 of FIG. 6).

As described above, the LiDAR and the camera in the perception system 101 (see FIG. 1b) may have overlapping fields of view, and the frustum-based object detection method takes advantage of the feature that the LiDAR and the camera have overlapping fields of view to combine the image acquired by the camera and the point cloud acquired by the LiDAR for object detection.

As shown in FIG. 6, the input network 601 may receive point clouds and images, such as the point cloud acquired by the LiDAR of the perception system 101 and the image acquired by the camera of the perception system 101. The input network 601 detects the bounding box of the object in the image and then, with the camera as an origin, extends in a direction to the bounding box, forming a frustum. The input network 601 determines which points in the point cloud locate within this frustum based on the relative pose of the camera and the LiDAR.

A feature extraction network 602 may extract features from the points within the frustum as determined by the input network 601. An example of the feature extraction network 602 is a PointNet network. The detection head 603 performs object detection based on features extracted by the feature extraction network 602, and the detection head 603 includes multiple (e.g., three) branches. A branch determines the group of points associated with the object in the surroundings of a vehicle (e.g., the vehicle 100) from the point cloud, generates the representation (e.g., a bounding box) of the object, and generates a confidence (i.e., a confidence of the existence of the object) corresponding to the group of points. The other branches of the detection head 603 determine a plurality of subsets of the group of points (e.g., the first subset and the second subset, with each branch determining one subset) to predict a plurality of parts of the object, e.g., the first part associated with the first subset and the second part associated with the second subset (with each branch predicting one part), and generate bounding boxes for the first part and the second part and confidences for the first part and the second part (i.e., a confidence that the object includes the first part and a confidence that the object includes the second part). The detection head 604 determines a plurality of subsets (e.g., the third subset and the fourth subset) for at least one subset of the plurality of subsets as determined by the detection head 603, such as the second subset, to predict a plurality of parts of the second part of the object, such as the third part associated with the third subset and the fourth part associated with the fourth subset, and generates bounding boxes for the third part and the fourth part and confidences corresponding to the third part and the fourth part (i.e., a confidence that the object includes the third part and a confidence that the object includes the fourth part). The output network 605 outputs the hierarchical representation of the object composed of the bounding boxes based on the above mentioned confidences.

FIG. 7 is a flowchart of the method for modeling an object according to a further embodiment of the present disclosure. The present embodiment provides a method for modeling an object for generating the hierarchical representation of the object, such as an articulated object. The method is implemented by any electronic device, such as the computing device 102 of the vehicle 100 shown in FIG. 1b.

As shown in FIG. 7, in step S701, the point cloud associated with the surroundings acquired by the perception system is obtained.

Step S701 is the same as step S201 in FIG. 2, and will not be described again here.

In step S702, from the point cloud, a first group of points that are associated with a first object in the surroundings and a second group of points that are associated with a second object in the surroundings are determined.

In this embodiment, the first group of points associated with the first object and the second group of points associated with the second object may be determined from the point cloud. Specifically, a machine learning model such as a neural network, or other models, may be taken to perform object recognition on the point cloud, which is not limited herein.

In step S703, based on the first group of points and the second group of points, a determination is made as to whether the first object and the second object have an association relationship.

In this embodiment, a determination may be made as to whether the first object and the second object have the association relationship based on some parameters as determined by the first group of points and the second group of points. The parameters may include, but are not limited to, the position, size, velocity, and the like, of the first object and the second object as determined based on the first group of points and the second group of points.

Alternatively, a decision tree or the like may be taken to determine whether the first object and the second object have the association relationship according to the parameters and a preset rule.

In step S704, in response to the first object and the second object having the association relationship, a hierarchical representation of the first object and the second object is generated, including a first representation of the first object and the second object, a second representation of the first object, and a third representation of the second object, and the second representation and the third representation locate at least partially within the first representation.

In this embodiment, if the first object and the second object are determined to have the association relationship, then the first representation is generated for the first object and the second object as a whole, the second representation is generated separately for the first object, and the third representation is generated separately for the second object, and since the first representation is an overall representation of the first object and the second object, the second representation and the third representation are located at least partially within the first representation.

For example, the first object is a tractor and the second object is a trailer, and if the tractor and the trailer are determined to have the association relationship, then a determination may be made that they belong to the same truck, in which case the first representation may be generated by taking the tractor of the truck and the trailer of the truck as a whole, the second representation may be generated separately for the tractor of the truck, and the third representation may be generated separately for the trailer of the truck, where the second representation and the third representation are at least partially located in the first representation.

On the basis of the above-mentioned embodiment, alternatively, determining whether the first object and the second object have the association relationship based on the first group of points and the second group of points in step S703 may specifically include:

determining a type of the first object based on the first group of points;

determining a type of the second object based on the second group of points; and determining whether the first object and the second object have the association relationship based on the type of the first object and the type of the second object.

In the present embodiment, the types of the first object and the second object are respectively recognized based on the first group of points and the second group of points, and then a determination is made as to whether the first object and the second object have the association relationship according to the types of the first object and the second object. For example, the types of the first object and the second object are recognized as a tractor and a trailer, respectively, based on the first group of points and the second group of points, the tractor typically being associated with the trailer. However, the determination based only on the type may be mistaken, for example, if two trucks are adjacent to each other, then the tractors and trailers of the two trucks may be wrongly associated; however, if there is only one truck in the point cloud of a current frame, the association relationship between the tractor and the trailer can be established only based on the type.

On the basis of the above-mentioned embodiment, alternatively, determining, based on the first group of points and the second group of points, whether the first object and the second object have an association relationship in step S703 may specifically include:

determining a positional relationship between the first object and the second object based on the first group of points and the second group of points; and determining that the first object and the second object have the association relationship in response to the first object being within a predetermined distance from the second object.

In the present embodiment, if a distance between the first group of points and the second group of points (i.e., a distance between the first object corresponding to the first group of points and the second object corresponding to the second group of points) is within a predetermined distance range, then the first object and the second object are determined to have the association relationship, where alternatively, the distance may include a transverse distance and a longitudinal distance; with the second object as a reference, the transverse distance and the longitudinal distance between the first object and the second object may be obtained; and if the transverse distance and the longitudinal distance satisfy the predetermined distance range, then the first object and the second object are determined to have the association relationship.

If the first object is a tractor and the second object is a trailer, and opposite edges (or the closest edges) of the tractor and the trailer are parallel or approximately parallel, a coordinate system may be established on one of the tractor and the trailer, and then the transverse distance and the longitudinal distance between them are determined; if transverse distance and the longitudinal distance satisfy the predetermined distance range, the tractor and the trailer are determined to belong to one truck; if the edge of the tractor is at an angle to the opposite edge of the trailer (or to the closest edge), the distance between midpoints of the opposite edges of the tractor and trailer and/or the nearest opposite edges of the tractor and trailer and/or the furthest opposite edges of the tractor and trailer may be obtained; if the predetermined distance range is met, the tractor and the trailer are determined to belong to one truck.

On the basis of the above-mentioned embodiment, determining whether the first object and the second object have the association relationship based on the first group of points and the second group of points includes:

determining a positional relationship between the first object and the second object and a velocity relationship between the first object and the second object based on the first group of points and the second group of points; and determining that the first object and the second object have the association relationship in response to the first object being within the predetermined distance from the second object and a difference in velocity between the first object and the second object being less than a predetermined threshold.

In the present embodiment, if the first object and the second object have the association relationship, then the first object and the second object are not only close in distance but also supposed to be close in velocity, therefore, it is possible to determine whether the first object and the second object have the association relationship based on both the positional relationship and the velocity relationship of the first object and the second object. Therein, the velocity relationship of the first object and the second object may be determined based on one or more of the point clouds and the images acquired by the perception system 101 of the vehicle 100 shown in FIG. 1b or otherwise.

Figure 8B:
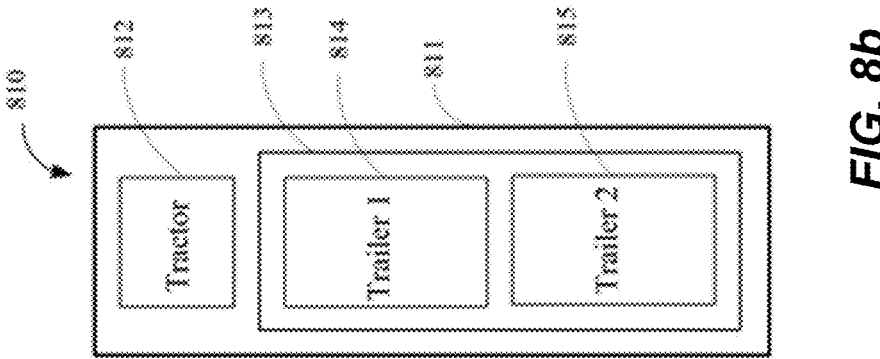
FIG. 8b shows a hierarchical representation of an object in a second state according to an embodiment of the present disclosure.
Figure 8A:
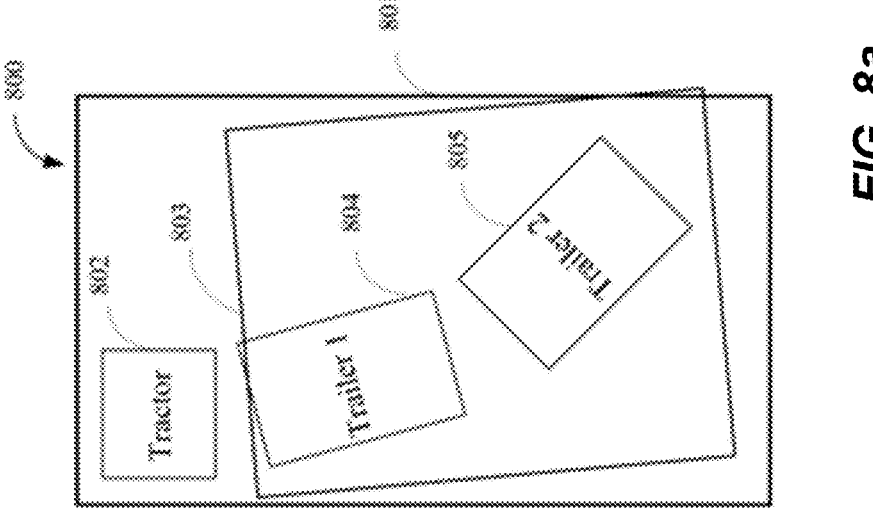
FIG. 8a shows a hierarchical representation of an object in a first state according to an embodiment of the present disclosure.

FIGS. 8a and 8b illustrate examples of a hierarchical representation (e.g., the hierarchical representation described above with reference to FIGS. 1b, 2, 3, 5, 6, and 7) of one object (e.g., an articulated object such as a truck) generated using sensor data acquired at different times by a perception system (e.g., the perception system 101 of the vehicle 100 shown in FIG. 1b) according to exemplary embodiments of the present disclosure. FIG. 8a shows the hierarchical representation of the object (e.g., a truck) generated based on the sensor data acquired by the perception system at a first time. FIG. 8b shows the hierarchical representation of the object generated based on the sensor data acquired by the perception system at a second time different from the first time. It can be seen from FIG. 8*a* that the truck is turning with an included angle between the tractor and the trailer. It can be seen from FIG. 8*b* that the truck is going straight, in which case the tractor is almost in line with the trailer.

Different parts of the object may have different relative positional relationships when the object is in different states. For example, as shown in FIG. 8*a*, the tractor and trailer of the truck have different poses (e.g., orientations) when the truck is turning, and for example, as shown in FIG. 8*b*, the tractor and trailer of the truck have the same poses (e.g., orientations) when the truck is going straight.

As shown in FIG. 8*a*, the truck-hierarchical representation 800 includes a bounding box 801. The bounding box 801 is determined based on a group of points associated with the truck in the point cloud. The shape and size of the bounding box 801 correspond to the shape and size of the truck as a whole. That is, the shape and size of the bounding box 801 approximates the shape and size of the truck.

The truck-hierarchical representation also includes a bounding box 802. The bounding box 802 is determined based on a subset of the group of points associated with the truck (i.e., a group of points associated with the tractor in the point cloud). The shape and size of the bounding box 802 corresponds to the shape and size of the tractor. That is, the shape and size of the bounding box 802 approximates the shape and size of the tractor.

The truck-hierarchical representation also includes a bounding box 803. The bounding box 803 is determined based on a subset of the group of points associated with the truck (i.e., a group of points associated with the trailer in the point cloud). The shape and size of the bounding box 803 correspond to the shape and size of the trailer. That is, the shape and size of the bounding box 803 approximates the shape and size of a trailer. In FIG. 8*a*, the bounding box 802 and the bounding box 803 are mostly located within the bounding box 801, but in other embodiments, the bounding box 801 may be made larger in size so that the bounding box 802 and the bounding box 803 are completely located within the bounding box 801.

Where the truck includes multiple trailers (e.g., the trailer 1 and the trailer 2), the truck-hierarchical representation may also include bounding boxes 804 and 805. The bounding boxes 804 and 805 are determined based on subsets of the group of points associated with the trailer (i.e., points associated with the trailer 1 and points associated with trailer 2 in the point cloud). The shape and size of the bounding boxes 804 and 805 correspond to the shape and size of trailer 1 and trailer 2, respectively. That is, the shape and size of the bounding boxes 804 and 805 approximate the shape and size of the trailer 1 and trailer 2. In FIG. 8*a*, the bounding boxes 804 and 805 are mostly located within the bounding box 803, but in other embodiments, the bounding box 803 may be made larger in size so that the bounding box 804 and the bounding box 805 are completely located within bounding box 803.

As shown in FIG. 8*b*, the truck-hierarchical representation 810 includes a bounding box 811. The bounding box 811 is determined based on a group of points associated with the truck in the point cloud. The shape and size of the bounding box 811 corresponds to the shape and size of the truck as a whole. That is, the shape and size of the bounding box 811 approximates the shape and size of the truck.

The truck-hierarchical representation also includes a bounding box 812. The bounding box 812 is determined based on a subset of the group of points associated with the truck (i.e., a group of points associated with the tractor in the point cloud). The shape and size of the bounding box 812 correspond to the shape and size of the tractor. That is, the shape and size of the bounding box 812 approximates the shape and size of the tractor.

The truck-hierarchical representation also includes a bounding box 813. The bounding box 813 is determined based on a subset of the group of points associated with the truck (i.e., a group of points associated with the trailer in the point cloud). The shape and size of the bounding box 813 correspond to the shape and size of the trailer. That is, the shape and size of the bounding box 813 approximates the shape and size of the trailer. In FIG. 8*b*, the bounding boxes 812 and 813 are located entirely within the bounding box 811.

Where the truck includes multiple trailers (e.g., the trailer 1 and the trailer 2), the truck-hierarchical representation may also include bounding boxes 814 and 815. The bounding boxes 814 and 815 are determined based on subsets of the group of points associated with the trailer (i.e., points associated with trailer 1 and points associated with trailer 2 in the point cloud). The shape and size of the bounding boxes 814 and 815 correspond to the shape and size of the trailer 1 and the trailer 2, respectively. That is, the shape and size of the bounding boxes 814 and 815 approximate the shape and size of the trailer 1 and the trailer 2. In FIG. 8*b*, the bounding boxes 814 and 815 are completely located within the bounding box 813.

As shown in FIG. 8*a*, while the truck is turning, the bounding boxes 802 and 803 are mostly located within the bounding box 801, and the bounding boxes 804 and 805 are mostly located within the bounding box 803. As shown in FIG. 8*b*, when the truck is traveling straight, the bounding boxes 812 and 813 are completely within the bounding box 811, and the bounding boxes 814 and 815 are completely within the bounding box 813. Further, it can be seen from FIGS. 8*a* and 8*b* that the size of the bounding box 801 is larger than the size of the bounding box 811, and the size of the bounding box 803 is larger than the size of the bounding box 813.

Figure 8C:
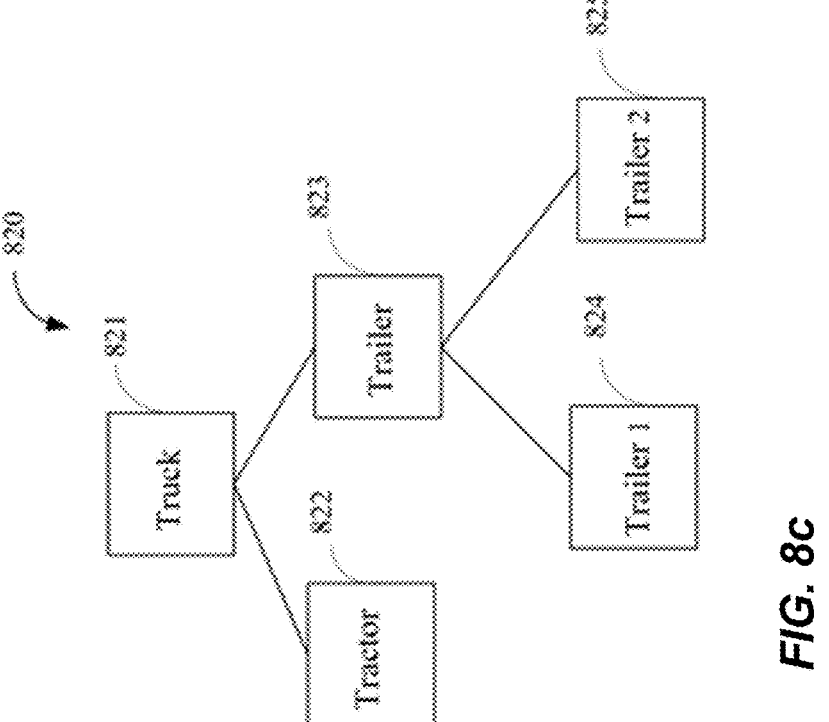
FIG. 8c is a tree diagram of a hierarchical representation of an object according to an embodiment of the present disclosure.

FIG. 8*c* is a tree diagram of the hierarchical representation (e.g., the hierarchical representation 800 shown in FIG. 8*a* and the hierarchical representation 810 shown in FIG. 8*b*) of an articulated object (e.g., a truck) according to an exemplary embodiment of the present disclosure. As shown in a tree 820 of FIG. 8*c*, the first level includes a node 821 that corresponds to the overall representation of the truck, such as the bounding box 801 in FIG. 8*a* and the bounding box 811 in FIG. 8*b*. That is, the overall representation of the truck is at the first level of the hierarchical representation of the truck. The second level includes nodes 822 and 823, corresponding to the representation of the tractor and the overall representation of the trailers, such as the bounding boxes 802 and 803 in FIG. 8*a* and the bounding boxes 812 and 813 in FIG. 8*b*, respectively. That is, the representation of the tractor and the overall representation of the trailers are at the second level of the hierarchical representation of the truck. Nodes 824 and 825 at the third level correspond to representations of different trailers (e.g., the trailer 1 and the trailer 2), such as the bounding boxes 804 and 805 in FIG. 8*a* and the bounding boxes 814 and 815 in FIG. 8*b*, respectively. That is, the representations of the trailers 1 and 2 are at the third level of the hierarchical representation of the truck. Where a truck includes a tractor and two trailers, such as the trailer 1 and the trailer 2, and is located near the vehicle 100, when the perception system 101 of the vehicle 100 is able to sense the tractor and the two trailers of the truck, the computing device 102 of the vehicle 100 generates a hierarchical representation for the truck as shown in FIG. 8c, which includes three levels. The computing device 102 of the vehicle 100 generates the hierarchical representation for the truck, including two levels, namely, the first level and the second level, when the truck is not completely observable by the perception system 101 of the vehicle, for example, only the tractor and one trailer of the truck can be sensed. The computing device 102 of the vehicle 100 generates the hierarchical representation for the truck, including only one level, namely, the first level, when the truck is not completely observable by the perception system 101 of the vehicle, for example, only the tractor of the truck can be sensed.

Figure 9:
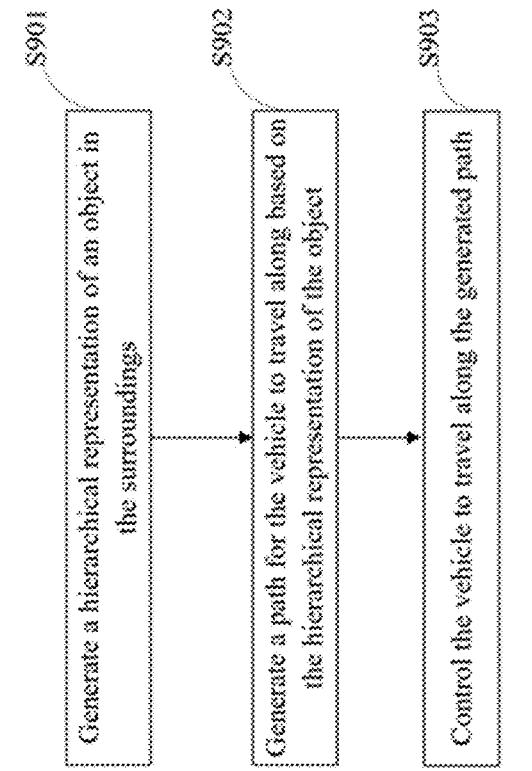
FIG. 9 is a flowchart of a vehicle control method according to an embodiment of the present disclosure.

FIG. 9 illustrates a flowchart of a vehicle control method, such as the vehicle 100 of FIGS. 1a and 1b, and the method may be performed, for example, by the computing device 102 of FIG. 1b.

In step S901, the computing device generates the hierarchical representation of the object in the surroundings of the vehicle. The computing device 102 on the vehicle 100 may generate the hierarchical representation of the object in the surroundings of the vehicle 100 based on the data (e.g., point clouds and/or images) associated with the surroundings acquired by the perception system 101.

The computing device 102 may generate the hierarchical representation of the object using any of the methods described above (e.g., the methods shown in FIGS. 2, 3, and 7). Thus, in some embodiments, step S901 includes steps S201 to S204 in FIG. 2; in some embodiments, step S901 includes steps S301 to S307 in FIG. 3, and in some embodiments, step S901 includes steps S701 to S704 in FIG. 7.

In step S902, the computing device generates a path (or trajectory) for the vehicle to travel along at least partly based on the hierarchical representation of the object. The computing device 102 may utilize the hierarchical representation of the object and combine data from the perception system 101, such as GPS transceiver data, RADAR data, LiDAR data, camera data, and/or data from other vehicle systems to determine the path or trajectory of the vehicle 100.

In step S903, the computing device controls the vehicle to travel along the path (or trajectory) as generated. The computing device 102 may generate and send control instructions to the control system of the vehicle 100 for controlling the operation of the vehicle 100 and components (or units) thereof so that the vehicle travels along the path (or trajectory) generated in step 902. The control system of the vehicle may include various units, such as a steering unit, a power control unit, and a braking unit.

Figure 10:
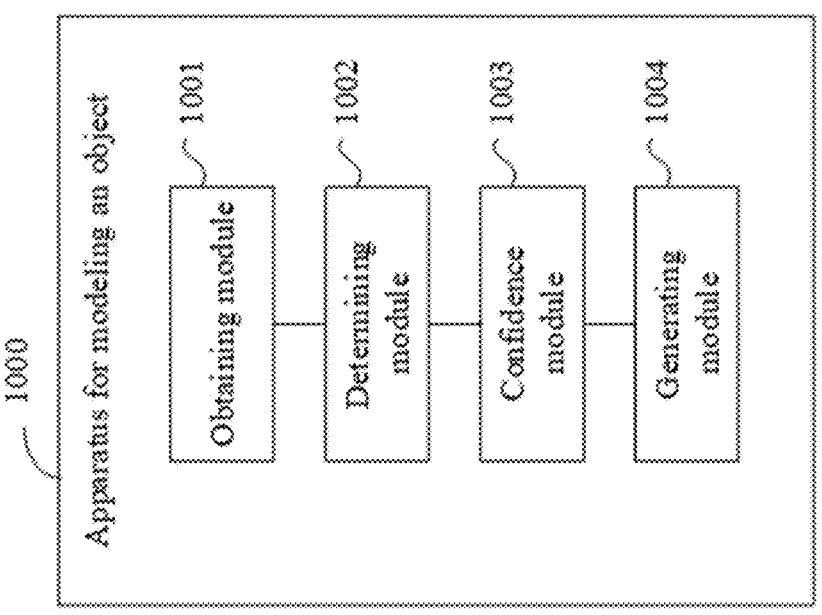
FIG. 10 is a block diagram of an apparatus for modeling an object according to an embodiment of the present disclosure.

FIG. 10 is a block diagram of an apparatus for modeling an object according to an embodiment of the present disclosure. The apparatus for modeling an object according to the present embodiment is provided in any electronic device and may implement the processing flow provided by the embodiment of the method for modeling an object. As shown in FIG. 10, the apparatus for modeling an object 1000 includes: an obtaining module 1001, a determining module 1002, a confidence module 1003, and a generating module 1004.

The obtaining module 1001 is configured to obtain a point cloud associated with surroundings acquired by a perception system.

The determining module 1002 is configured to determine, from the point cloud, a group of points associated with the object and a first subset and a second subset of the group of points.

The confidence module 1003 is configured to determine, based on the first subset and the second subset, a first confidence that the object includes a first part associated with the first subset and a second confidence that the object includes a second part associated with the second subset.

The generating module 1004 is configured to, in response to both the first confidence and the second confidence being above a predetermined threshold, generate a hierarchical representation of the object, including a first representation of the object, a second representation of the first part, and a third representation of the second part, the second and third representations being at least partially located within the first representation.

In one or more embodiments of the present disclosure, the determining module 1002 is further configured to determine a third subset and a fourth subset included in the second subset of the group of points.

The confidence module 1003 is further configured to determine, based on the third subset and the fourth subset, a third confidence that the object includes a third part associated with the third subset and a fourth confidence that the object includes a fourth part associated with the fourth subset.

The generating module 1004 is further configured to generate a fourth representation of the third part and a fifth representation of the fourth part in response to both the third and fourth confidences being above the predetermined threshold, the fourth and fifth representations being at least partially within the third representation.

In one or more embodiments of the present disclosure, the first representation has a first geometry, the second representation has a second geometry, the third representation has a third geometry, the fourth representation has a fourth geometry, and the fifth representation has a fifth geometry.

In one or more embodiments of the present disclosure, at least one of the first geometry, the second geometry, the third geometry, the fourth geometry, and the fifth geometry is rectangular.

In one or more embodiments of the present disclosure, the determining module 1002, when determining, from the point cloud, the group of points associated with the object and the first subset and the second subset of the group of points, is configured to:

determine a type of the object based on the group of points; and determine the first subset and the second subset of the group of points in response to the type of the object being a predetermined type.

In one or more embodiments of the present disclosure, the determining module 1002, when determining, from the point cloud, the group of points associated with the object and the first subset and the second subset of the group of points, is configured to:

perform feature detection on the point cloud to determine the group of points associated with the object from the point cloud; and perform feature detection on the group of points to determine the first subset of the group of points that is associated with the first part and the second subset of the group of points that is associated with the second part.

In one or more embodiments of the present disclosure, the determining module 1002, when determining, from the point cloud, the group of points associated with the object and the first subset and the second subset of the group of points, is configured to:

determine a part of the point cloud based on image data associated with the object; and perform feature detection on the part of the point cloud to determine the group of points associated with the object from the point cloud, the first subset of the group of points that is associated with the first part, and a second subset of the group of points that is associated with the second part.

In one or more embodiments of the present disclosure, the second and third representations have a first positional relationship in response to the object being in a first state and have a second positional relationship in response to the object being in a second state, and the first positional relationship is different from the second positional relationship.

In one or more embodiments of the present disclosure, the first representation has a first size and the second and third representations are located within the first representation in response to the object being in the first state, and the first representation has a second size and the second and third representations are located within the first representation in response to the object being in the second state.

In one or more embodiments of the present disclosure, the object includes a truck, the first part includes a tractor, and the second part includes a trailer.

The apparatus for modeling an object according to the embodiment of the present disclosure may be taken to implement the technical solution of the embodiment of the method shown in FIGS. 2 to 4 above, and the apparatus and the method have similar implementation principles and technical effects, which will not be described in detail herein.

Figure 11:
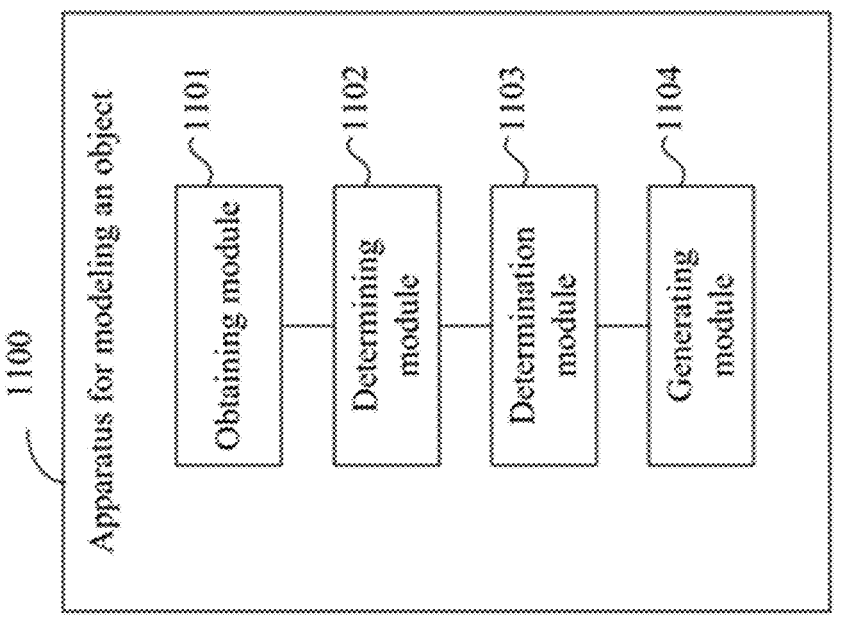
FIG. 11 is a block diagram of an apparatus for modeling an object according to another embodiment of the present disclosure.

FIG. 11 is a block diagram of the apparatus for modeling an object according to an embodiment of the present disclosure. The apparatus for modeling an object according to the present embodiment is provided in any electronic device and may execute the processing flow provided by the embodiment of the method for modeling an object. As shown in FIG. 11, the apparatus for modeling an object 1100 includes: an obtaining module 1101, a determining module 1102, a determination model 1103, and a generating module 1104.

The obtaining module 1101 is configured to obtain a point cloud associated with surroundings acquired by a perception system.

The determining module 1102 is configured to determine, from the point cloud, a first group of points that are associated with a first object in the surroundings and a second group of points that are associated with a second object in the surroundings.

The determination model 1103 is configured to determine, based on the first group of points and the second group of points, whether the first object and the second object have an association relationship.

The generating module 1104 is configured to generate a first representation of the first object and the second object, a second representation of the first object, and a third representation of the second object in response to the first object and the second object having the association relationship, the second representation and the third representation being at least partially located within the first representation.

In one or more embodiments of the present disclosure, the determination model 1103, when determining, based on the first group of points and the second group of points, whether the first object and the second object have the association relationship, is configured to:

determine a type of the first object based on the first group of points;

determine a type of the second object based on the second group of points; and determine whether the first object and the second object have the association relationship based on the type of the first object and the type of the second object.

In one or more embodiments of the present disclosure, the determination model 1103, when determining, based on the first group of points and the second group of points, whether the first object and the second object have the association relationship, is configured to:

determine a positional relationship between the first object and the second object based on the first group of points and the second group of points; and determine that the first object and the second object have the association relationship in response to the first object being within a predetermined distance from the second object.

In one or more embodiments of the present disclosure, the determination model 1103, when determining, based on the first group of points and the second group of points, whether the first object and the second object have the association relationship, is configured to:

determine a positional relationship between the first object and the second object and a velocity relationship between the first object and the second object based on the first group of points and the second group of points; and determine that the first object and the second object have the association relationship in response to the first object being within the predetermined distance from the second object and a difference in velocity between the first object and the second object being less than a predetermined threshold.

The apparatus for modeling an object according to the embodiment of the present disclosure may be taken to implement the technical solution of the embodiment of the method shown in FIG. 7 above, and the apparatus and the method have similar implementation principles and technical effects, which will not be described in detail herein.

Figure 12:
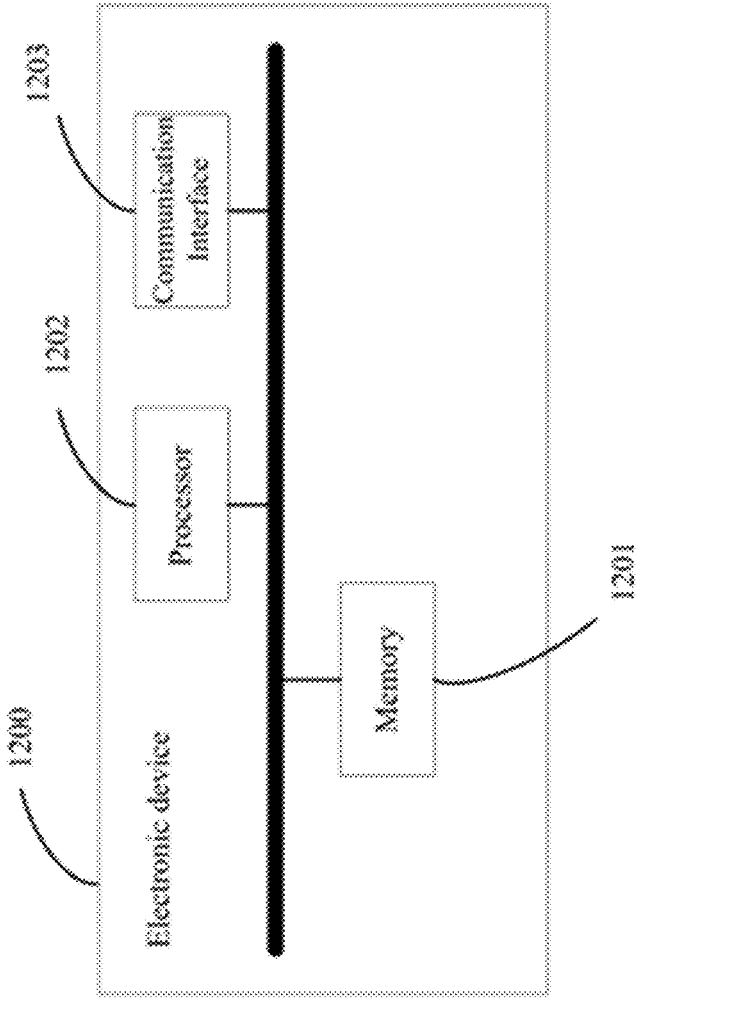
FIG. 12 is a block diagram of an electronic device according to an embodiment of the present disclosure.

FIG. 12 shows a schematic diagram of a hardware structure of an electronic device according to an embodiment of the present disclosure. As shown in FIG. 12, the electronic device 1200 is configured to implement the corresponding electronic device (such as the computing device 102 shown in FIG. 1b) in any of the above-mentioned method embodiments, and the electronic device 1200 of the present embodiment may include: a memory 1201, a processor 1202, and a communication interface 1203.

The memory 1201 is configured to store a computer program. The memory 1201 may be a high-speed random-access memory (RAM), and a non-volatile memory (NVM), such as at least one magnetic disk memory, and may also be a USB disk, a removable hard disk, a read-only memory, a magnetic or optical disk, etc.

The processor 1202 is configured to execute the computer program stored in the memory to implement the method in any of the above-mentioned embodiments, and reference can be made to the relevant description in the above-mentioned embodiments of the method. The processor 1202 may be a central processing unit (CPU), other general-purpose processors, a digital signal processor (DSP), an application-specific integrated circuit (ASIC), etc. The general-purpose processor may be a microprocessor, but in the alternative, the processor may be any conventional processor. The steps of the method disclosed in connection with the present disclosure may be embodied directly in a hardware processor for execution, or in a combination of hardware and software modules within the processor for execution.

Alternatively, the memory 1201 may be separate from or integrated with the processor 1202. When the memory 1201 is separate from the processor 1202, the electronic device 1200 may also include a bus. The bus is configured to connect the memory 1201 and the processor 1202. The bus may be an Industry Standard Architecture (ISA) bus, a Peripheral Component Interconnect (PCI) bus, or an Extended Industry Standard Architecture (EISA) bus, etc. The bus may be divided into an address bus, a data bus, a control bus, etc. For ease of illustration, the bus in the figures of the present disclosure is not limited to only one bus or one type of bus.

The communication interface 1203 is configured to receive or transmit various data and/or instructions.

The electronic device provided in the present embodiment may be taken to perform the method in the above-mentioned embodiments in a similar manner and with similar technical effects, which will not be described in detail herein.

In addition, this embodiment further provides a computer-readable storage medium having stored therein a computer program executable by the processor to implement the method according to any of the embodiments described above.

In addition, this embodiment further provides a computer program product including the computer program executable by the processor to implement the method according to any of the embodiments described above.

In the examples provided herein, it should be understood that the disclosed apparatus and method may be implemented in other ways. For example, the apparatus embodiments described above are merely illustrative, e.g., the division of elements is merely logical and functional, and in actual implementations, there may be additional divisions, for example, multiple elements or components may be combined or integrated into another system, or some features may be omitted, or not performed. In another aspect, the couplings or direct couplings or communication connections shown or discussed with respect to each other may be indirect couplings or communication connections through some interface, device, or unit, and may be electrical, mechanical, or otherwise.

The elements described as separate components may or may not be physically separated, the components shown as elements may or may not be physical elements, that is, they may be located in one place or distributed over a plurality of network elements. Some or all of the elements may be selected to achieve the object of the embodiments according to actual needs.

In addition, all the functional units in the embodiments of the present disclosure may be integrated in one processing unit, each unit may be physically present separately, or two or more units may be integrated in one unit. The above-mentioned integrated units can be realized in the form of hardware or in the form of hardware-plus-software functional units.

The integrated units described above, implemented in the form of software functional units, may be stored in a computer-readable storage medium. The software functional units described above are stored in a storage medium, including instructions to cause a computer device (a personal computer, a server, or a network device, etc.) or a processor to perform some of the steps of the method as described in various embodiments of the present disclosure. The storage medium includes a USB disk, removable hard disk, read-only memory (ROM), random access memory (RAM), magnetic or optical disk, and other various media that can store the program code.

It can be clearly understood by a person skilled in the art that, for the convenience and brevity of description, only the above division of the functional modules is exemplified, and in practical applications, the above functions may be assigned to different functional modules for implementation according to needs, that is, an internal structure of a device is divided into different functional modules so as to perform all or part of the functions described above. To learn about the specific operation of the apparatus described above, reference may be made to the corresponding process in the foregoing method embodiments, which will not be described in detail herein.

The above-mentioned embodiments are merely illustrative of the technical solutions of the embodiments of the present disclosure, rather than limiting same; although the embodiments of the present disclosure have been described in detail with reference to the foregoing embodiments, those skilled in the art will appreciate that the technical solutions disclosed in the above-mentioned embodiments can still be modified, or some or all of the technical features thereof can be replaced by equivalents; however, these modifications or replacements do not bring the essence of the corresponding technical solutions out of the scope of the technical solutions of the embodiments herein.

Other embodiments of the present disclosure will be apparent to those skilled in the art on the basis of the specification herein and the practice of the present disclosure. This present disclosure is intended to cover any variations, uses, or adaptations thereof following, in general, the principles of the present disclosure and including such departures from the present disclosure as come within known or customary practice in the art to which the present disclosure pertains. It is intended that the specification and examples be considered as exemplary only, with a true scope and spirit of the application being defined by the appended claims.

It should be understood that the present disclosure is not limited to the precise arrangements described above and shown in the accompanying drawings, and that various modifications and changes may be made without departing from the scope thereof. The scope of the present disclosure is defined only by the appended claims.

What is claimed is:

1. A method, comprising:

obtaining a point cloud associated with surroundings of a perception system;

determining, from the point cloud, a group of points associated with an object and a first subset and a second subset of the group of points;

determining, based on the first subset and the second subset, a first confidence that the object comprises a first part associated with the first subset and a second confidence that the object comprises a second part associated with the second subset;

determining whether at least two parts of an articulated object which are articulated with each other are sensed by the perception system based on the first confidence and the second confidence; and in response to both the first confidence and the second confidence being above a predetermined threshold, determining that the at least two parts of the articulated object are sensed by the perception system and generating a hierarchical representation of the object, comprising a first representation of the object, a second representation of the first part, and a third representation of the second part, the second and third representations being at least partially located within the first representation.

2. The method according to claim 1, further comprising: determining a third subset and a fourth subset comprised in the second subset of the group of points;

determining, based on the third subset and the fourth subset, a third confidence that the object comprises a third part associated with the third subset and a fourth confidence that the object comprises a fourth part associated with the fourth subset;

generating a fourth representation of the third part and a fifth representation of the fourth part in response to both the third and fourth confidences being above the predetermined threshold, the fourth and fifth representations being at least partially located within the third representation.

3. The method according to claim 2, wherein the first representation has a first geometry, the second representation has a second geometry, the third representation has a third geometry, the fourth representation has a fourth geometry, and the fifth representation has a fifth geometry.

4. The method according to claim 3, wherein at least one of the first geometry, the second geometry, the third geometry, the fourth geometry, and the fifth geometry is rectangular.

5. The method according to claim 1, wherein determining, from the point cloud, the group of points associated with the object and the first subset and the second subset of the group of points comprises:

determining a type of the object based on the group of points; and determining the first subset and the second subset of the group of points in response to the type of the object being a predetermined type.

6. The method according to claim 1, wherein determining, from the point cloud, the group of points associated with the object and the first subset and the second subset of the group of points comprises:

performing feature detection on the point cloud to determine the group of points associated with the object from the point cloud; and performing feature detection on the group of points to determine the first subset of the group of points that is associated with the first part and the second subset of the group of points that is associated with the second part.

7. The method according to claim 1, wherein determining, from the point cloud, the group of points associated with the object and the first subset and the second subset of the group of points comprises:

determining a part of the point cloud based on image data associated with the object; and performing feature detection on the part of the point cloud to determine, from the point cloud, the group of points associated with the object, the first subset of the group of points that is associated with the first part, and the second subset of the group of points that is associated with the second part.

8. The method according to claim 1, wherein the second and third representations have a first positional relationship in response to the object being in a first state and have a second positional relationship in response to the object being in a second state, and the first positional relationship is different from the second positional relationship.

9. The method according to claim 8, wherein the first representation has a first size and the second and third representations are located within the first representation in response to the object being in the first state, and wherein the first representation has a second size and the second and third representations are located within the first representation in response to the object being in the second state.

10. The method according to claim 1, wherein the object comprises a truck, the first part comprises a tractor, and the second part comprises a trailer.

11. The method according to claim 1, further comprising: generating a trajectory for the vehicle to travel along at least partly based on the hierarchical representation of the object; and controlling the vehicle to travel along the generated trajectory.

12. A method, comprising:

obtaining a point cloud associated with surroundings of a perception system;

determining, from the point cloud, a first group of points that are associated with a first object in the surroundings and a second group of points that are associated with a second object in the surroundings;

determining, based on the first group of points and the second group of points, whether the first object is within a predetermined distance from the second object to determine whether the first object is articulated to the second object;

generating a first representation of the first object and the second object, a second representation of the first object, and a third representation of the second object in response to the first object being articulated to the second object, the second representation and the third representation being at least partially located within the first representation.

13. The method according to claim 12, further comprising:

determining a velocity relationship between the first object and the second object based on the first group of points and the second group of points; and determining that the first object is articulated to the second object in response to the first object being within the predetermined distance from the second object and a difference in velocity between the first object and the second object being less than a predetermined threshold.

14. The method according to claim 12, further comprising:

generating a trajectory for the vehicle to travel along at least partly based on the hierarchical representation of the object; and controlling the vehicle to travel along the generated trajectory.

15. An electronic device, comprising: a processor and a memory, wherein the memory stores program instructions executable by the processor to implement a method comprising:

obtaining a point cloud associated with surroundings of a perception system;

determining, from the point cloud, a group of points associated with an object and a first subset and a second subset of the group of points;

determining, based on the first subset and the second subset, a first confidence that the object comprises a first part associated with the first subset and a second confidence that the object comprises a second part associated with the second subset;

determining whether at least two parts of an articulated object which are articulated with each other are sensed by the perception system based on the first confidence and the second confidence; and in response to both the first confidence and the second confidence being above a predetermined threshold, determining that the at least two parts of the articulated object are sensed by the perception system and generating a hierarchical representation of the object, comprising a first representation of the object, a second representation of the first part, and a third representation of the second part, the second and third representations being at least partially located within the first representation.

16. The electronic device according to claim 15, wherein determining, from the point cloud, the group of points associated with the object and the first subset and the second subset of the group of points comprises:

performing feature detection on the point cloud to determine the group of points associated with the object from the point cloud; and performing feature detection on the group of points to determine the first subset of the group of points that is associated with the first part and the second subset of the group of points that is associated with the second part.

17. The electronic device according to claim 15, wherein determining, from the point cloud, the group of points associated with the object and the first subset and the second subset of the group of points comprises:

determining a part of the point cloud based on image data associated with the object; and performing feature detection on the part of the point cloud to determine, from the point cloud, the group of points associated with the object, the first subset of the group of points that is associated with the first part, and the second subset of the group of points that is associated with the second part.

18. The electronic device according to claim 15, wherein the second and third representations have a first positional relationship in response to the object being in a first state and have a second positional relationship in response to the object being in a second state, and the first positional relationship is different from the second positional relationship.

19. The electronic device according to claim 18, wherein the first representation has a first size and the second and third representations are located within the first representation in response to the object being in the first state, and wherein the first representation has a second size and the second and third representations are located within the first representation in response to the object being in the second state.

20. The electronic device according to claim 15, wherein the object comprises a truck, the first part comprises a tractor, and the second part comprises a trailer.

* * * * *